United States Patent
Yu et al.

(10) Patent No.: US 12,115,493 B2
(45) Date of Patent: Oct. 15, 2024

(54) APPARATUS AND METHOD FOR MIXING TRANSMISSION AND SEPARATION OF HYDROGEN GAS AND NATURAL GAS RECOVERED BASED ON PRESSURE ENERGY

(71) Applicant: GuangDong QingYi Energy Technology Co., Ltd., Guangdong (CN)

(72) Inventors: Huajie Yu, Jiangsu (CN); Jianyun Yin, Anhui (CN)

(73) Assignee: GuangDong QingYi Energy Technology Co., Ltd., Shenzhen (CN)

( * ) Notice: Subject to any disclaimer, the term of this patent is extended or adjusted under 35 U.S.C. 154(b) by 217 days.

(21) Appl. No.: 17/691,150

(22) Filed: Mar. 10, 2022

(65) Prior Publication Data
US 2023/0219033 A1 Jul. 13, 2023

(30) Foreign Application Priority Data
Jan. 11, 2022 (CN) .......................... 202210028111.8

(51) Int. Cl.
*B01D 53/22* (2006.01)
*B01D 53/053* (2006.01)
(Continued)

(52) U.S. Cl.
CPC ......... *B01D 53/229* (2013.01); *B01D 53/053* (2013.01); *B01D 53/22* (2013.01);
(Continued)

(58) Field of Classification Search
None
See application file for complete search history.

(56) References Cited

U.S. PATENT DOCUMENTS

| 2010/0322845 A1* | 12/2010 | De Souza | C01B 3/56 96/4 |
| 2014/0030615 A1* | 1/2014 | Pollica | H01M 8/0675 95/55 |
| 2022/0143549 A1* | 5/2022 | Bauer | F17D 1/04 |

FOREIGN PATENT DOCUMENTS

| CN | 107314242 A | 11/2017 | |
| CN | 112922806 A * | 6/2021 | ............. B01D 53/22 |
| EP | 2979743 A1 * | 7/2014 | ............. B01D 53/22 |

OTHER PUBLICATIONS

English language machine translation for CN 112922806 A. Retrieved from translationportal.epo.org on Dec. 7, 2023. (Year: 2023).*
(Continued)

*Primary Examiner* — Jason M Greene
(74) *Attorney, Agent, or Firm* — Samson G. Yu

(57) ABSTRACT

Disclosed is an apparatus and method for mixing transmission and separation of hydrogen gas and natural gas recovered based on pressure energy. The method includes: (1) hydrogen compressed natural gas is introduced into the pressure energy recovery system; (2) the low-pressure hydrogen compressed natural gas is introduced into the separation system; (3) the low-hydrogen natural gas and the high concentration hydrogen gas are introduced into a first natural gas buffer tank and a first hydrogen gas buffer tank respectively; (4) the low-hydrogen natural gas and the high concentration hydrogen gas are introduced into the pressure boosting system; (5) the low-hydrogen natural gas and the high concentration hydrogen gas are respectively introduced into a natural gas user end. The method of the present invention is low in energy consumption, so as to realize pressure energy recovery, and energy consumption of hydrogen gas separation is greatly reduced.

10 Claims, 1 Drawing Sheet

(51) Int. Cl.
    *C01B 3/50*         (2006.01)
    *C10L 3/10*         (2006.01)

(52) U.S. Cl.
    CPC ............... *C01B 3/503* (2013.01); *C10L 3/10* (2013.01); *B01D 2053/221* (2013.01); *B01D 2257/108* (2013.01); *B01D 2257/702* (2013.01); *C01B 2203/0405* (2013.01); *C01B 2203/062* (2013.01); *C01B 2210/0012* (2013.01); *C10L 2290/548* (2013.01)

(56) References Cited

OTHER PUBLICATIONS

English language machine translation for EP 2979743 A1. Retrieved from translationportal.epo.org on Dec. 7, 2023. (Year: 2023).*

* cited by examiner

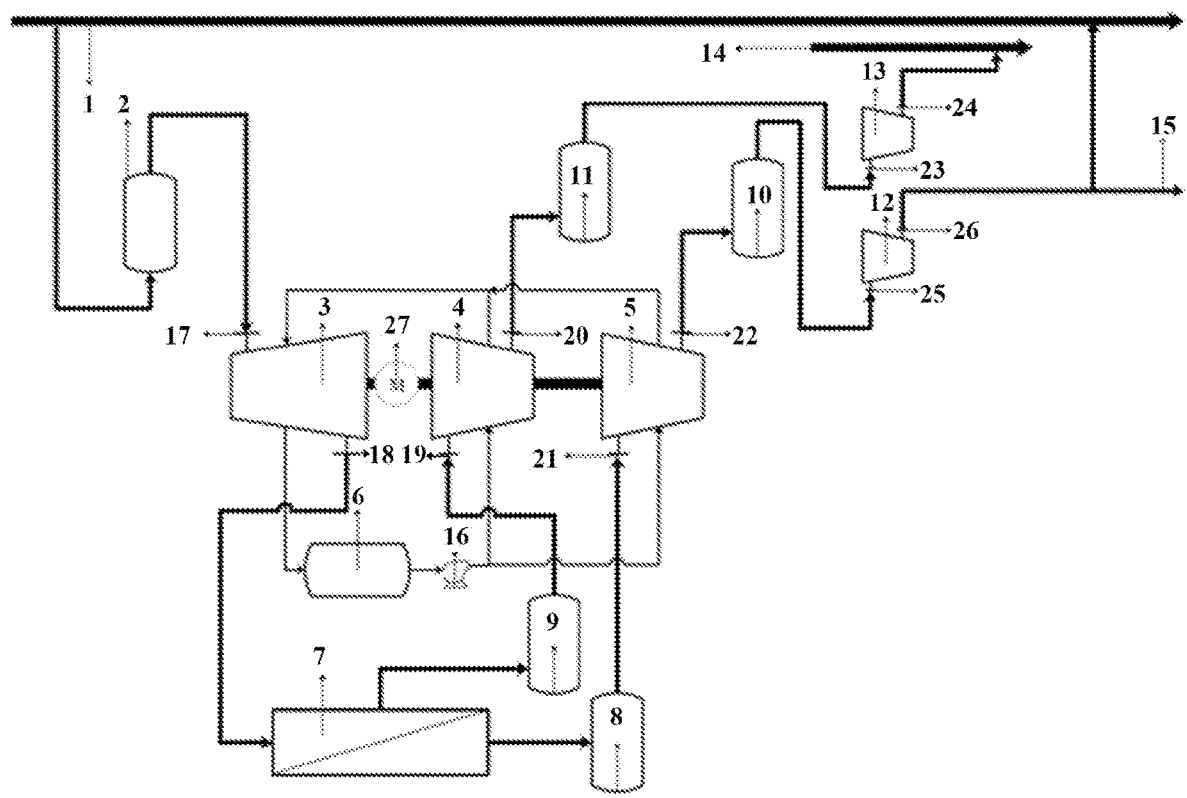

APPARATUS AND METHOD FOR MIXING TRANSMISSION AND SEPARATION OF HYDROGEN GAS AND NATURAL GAS RECOVERED BASED ON PRESSURE ENERGY

CROSS REFERENCE TO RELATED APPLICATION

This application claims priority benefit of Chinese Patent Application No. 202210028111.8, filed on Jan. 11, 2022, and the entire contents of which are incorporated herein by reference.

TECHNICAL FIELD

The present invention belongs to the technical field of energy, and particularly relates to an apparatus and method for mixing transmission and separation of hydrogen gas and natural gas recovered based on pressure energy.

BACKGROUND

Hydrogen energy is constantly supported by countries around the world. At present, developed countries such as Japan, Australia, Germany, Italy are actively studying hydrogen compressed natural gas. It may be said that it will become a trend to apply the hydrogen energy into natural gas industry. However, there are several methods for separating hydrogen gas from natural gas, i.e. cryogenic separation, membrane separation, and Pressure Swing Adsorption (PSA) process. For example, patent application No. CN101535174A reports a hydrogen gas separation method and a separation apparatus, which employs the PSA process. During the process, a cycle is repeatedly performed, including an adsorption step of introducing the mixed gas into the adsorption tower to adsorb unnecessary gas contained in the mixed gas by the adsorbent to discharge product gas with high hydrogen gas concentration from the adsorption, tower, and a desorption step of desorbing the unnecessary gas from the adsorbent to discharge the unnecessary gas from the adsorption tower. The separation method reported by patent application No. CN108147365A is essentially a membrane separation method, the purpose of separating hydrogen gas is achieved by using the selective permeability of a membrane material.

Shortcomings of high energy consumption and investment costs are commonly found in the above-mentioned several hydrogen gas process means. The cryogenic separation process requires a large amount of gas to be liquefied, the PSA process requires repeated pressurization and decompression, and for high-concentration pressurized gas, the membrane separation process has the lowest operating energy consumption among the several methods. But if the gas is not pressurized, a compressor is required to provide pressure.

The high operating energy consumption in the above-mentioned several separation means is one of the important constraints applied to the separation of hydrogen compressed natural gas.

SUMMARY

For the above-mentioned disadvantage of existing mixing transmission technology of hydrogen gas and natural gas, the present invention provides an apparatus and method for mixing, transmission and separation of hydrogen gas and natural gas recovered based on pressure energy. A pressure energy recovery module, a membrane separation module and a pressure boosting module are employed to convert the pressure released from the hydrogen compressed natural gas into mechanical energy, to provide power for pressurizing the separated hydrogen gas/natural gas, recovering pressure energy, and reducing energy consumption of system operation.

The apparatus for mixing transmission and separation of hydrogen gas and natural gas recovered based on pressure energy in the present invention includes a hydrogen compressed natural gas pipeline, a pressure energy recovery system, a separation system and a pressure boosting system; the pressure energy recovery system is composed of an expander, a first natural gas compressor, and a first hydrogen gas compressor; the expander is provided thereon with a gas inlet, a gas outlet, a water inlet and a water outlet; the first natural gas compressor is provided thereon with a gas inlet, a gas outlet, a water inlet and a water outlet; the first hydrogen gas compressor is provided thereon with a gas inlet, a gas outlet, a water inlet and a water outlet; the expander is assembled with a auxiliary motor, and the first natural gas compressor is connected in parallel with the first hydrogen gas compressor, and is assembled with the auxiliary motor; the separation system is composed of a separation apparatus, a first hydrogen gas buffer tank, and a first natural gas buffer tank; the separation apparatus is provided with a gas inlet, a hydrogen gas outlet, and a natural gas outlet; the first hydrogen gas buffer tank is provided thereon with a gas inlet and a gas outlet, the first natural gas buffer tank is provided thereon with a gas inlet and a gas outlet; the pressure boosting system is composed of a second natural gas compressor and a second hydrogen gas compressor; the second natural gas compressor is provided thereon with a gas inlet and a gas outlet, and the second hydrogen gas compressor is provided thereon with a gas inlet and a gas outlet; the gas outlet of the hydrogen compressed natural gas pipeline is communicated with an inlet of a general buffer tank, an outlet of the general buffer tank is communicated with the gas inlet of the expander, and the gas outlet of the expander is communicated with the gas inlet of the separation apparatus, the hydrogen gas outlet of the separation apparatus is communicated with the gas inlet of the first hydrogen gas buffer tank, the natural gas outlet of the separation apparatus is communicated with the gas inlet of the first natural gas buffer tank; the gas outlet of the first hydrogen gas buffer tank is communicated with the gas inlet of the first hydrogen gas compressor, and the gas outlet of the first natural gas buffer tank is communicated with the gas inlet of the first natural gas compressor; the gas outlet of the first hydrogen gas compressor is communicated with the gas inlet of the second hydrogen gas buffer tank, the gas outlet of the first natural gas compressor is communicated with the gas inlet of the second natural gas buffer tank; the gas outlet of the second hydrogen gas buffer tank is communicated with the gas inlet of the second hydrogen gas compressor; the gas outlet of the second natural gas buffer tank is communicated with the gas inlet of the second natural gas compressor; the gas outlet of the second hydrogen gas compressor is communicated with a hydrogen gas user end or the hydrogen compressed natural gas pipeline; the gas outlet of the second natural gas compressor is communicated with the hydrogen compressed natural gas pipeline, or a natural gas user end.

In the above-mentioned apparatus, the water outlet of the expander is communicated with a water inlet of a water storage tank, a water outlet of the water storage tank is simultaneously communicated with the water inlet of the first natural gas compressor and the water inlet of the first hydrogen gas compressor through a pipeline equipped with a water pump; the water outlet of the first natural gas compressor and the water outlet of the first hydrogen gas compressor are simultaneously communicated with the water inlet of the expander through the pipeline.

In the above-mentioned apparatus, the separation apparatus is a membrane separation apparatus or a pressure swing adsorption apparatus, or a membrane separation-pressure swing adsorption apparatus.

The method for mixing transmission and separation of hydrogen gas and natural gas recovered based on pressure energy in the present invention is processed in the following steps.

(1) Hydrogen compressed natural gas in a hydrogen compressed, natural gas pipeline is introduced into a general buffer tank, the hydrogen compressed natural gas in the general buffer tank is introduced into an expander, and the pressure of the hydrogen compressed natural gas is released through the expander, and then low-pressure hydrogen compressed natural gas is formed; the transition of the pressure energy recovery apparatus from a start-up to a stable operation is divided into two stages: a start-up stage and a stable stage; in the start-up stage, the hydrogen compressed natural gas enters into the expander and provides primary power to the pressure energy recovery system through an auxiliary motor, energy is released through gas expansion to provide a portion of power; during the gas expansion, the auxiliary motor is controlled to provide gradually decreased power, and the power provided by the gas expansion is gradually increased; when the rotating speed of a turbine wheel of the expander reaches a stable state, i.e. entering into the stable stage, at the moment the auxiliary motor is only used to maintain the turbine wheel rotating speed of the expander in a normal working section.

(2) The low-pressure hydrogen compressed natural gas is introduced into a separation apparatus, and is discharged, after separated, from the hydrogen gas outlet and the natural gas outlet, respectively, and low-hydrogen natural gas and high concentration hydrogen gas are respectively formed; the volume concentration of hydrogen gas in the low-hydrogen natural gas is ≤3%; the volume concentration of hydrogen gas in the high concentration hydrogen gas is ≥80%.

(3) The low-hydrogen natural gas and high concentration hydrogen gas are introduced into the first natural gas buffer tank and the first hydrogen gas buffer tank respectively, and then are introduced into the first natural gas compressor and the first hydrogen gas compressor, and after first compression, are formed into once-compressed natural gas and once-compressed hydrogen gas.

(4) The once-compressed natural gas and the once-compressed hydrogen gas are introduced into the second natural gas buffer tank and the second hydrogen gas buffer tank respectively, and then are introduced into the second natural gas compressor and the second hydrogen gas compressor, and after second compression, are formed into twice-compressed natural gas and twice-compressed hydrogen gas;

(5) The twice-compressed natural gas and twice-compressed hydrogen gas are respectively introduced into the natural gas user end and the hydrogen gas user end or are returned back to the hydrogen compressed natural gas pipeline.

At S(3), after the turbine wheel rotating speed of the expander reaches a stable state and when the gas in the expander expands, the wheel of the expander is pushed to rotate; when the wheel of the expander rotates, a rotating shaft is driven to rotate to provide mechanical energy for the first natural gas compressor and the first hydrogen gas compressor.

At S(3), a water pump assembled with a water storage tank is switched on to introduce cooling water in the water storage tank into the first natural gas compressor and the first hydrogen gas compressor; when the first natural gas compressor and the first hydrogen gas compressor are operating, thermal energy generated is absorbed by the cooling water, the cooling water that absorbs thermal energy is introduced into the expander to exchange heat with residual cold generated by operation of the expander, then the cooling water is formed again and returned back to the water storage tank; during the process, thermal energy generated by the first natural gas compressor and the first hydrogen gas compressor is neutralized with the cold energy generated by the expander.

At S(1), the pressure of the hydrogen compressed natural gas in the hydrogen compressed natural gas pipeline is ≤10 MPa.

At S(1), the pressure of the low-pressure hydrogen compressed natural gas formed after the pressure in the expander is released is ≤4 MPa.

At S(3), the pressure of the once-compressed natural gas is 50% to 95% of the pressure of the hydrogen compressed natural gas; the pressure of the once-compressed hydrogen gas is 50% to 95% of the pressure of the hydrogen compressed natural gas.

At S(3), when the expander is used to release pressure, the mechanical energy is recovered to be used as the mechanical energy of the first natural gas compressor and the first hydrogen gas compressor, the recovery rate of the mechanical energy is from 50% to 95%.

At S(4), the pressure of the twice-compressed natural gas is 1.1 to 1.2 times the pressure of the hydrogen compressed natural gas; when the twice-compressed hydrogen gas returns back to the hydrogen compressed natural gas pipeline, the pressure of the twice-compressed hydrogen gas is 1.1 to 1.2 times the pressure of the hydrogen compressed natural gas; when the twice-compressed hydrogen gas is introduced into the hydrogen gas user end, the pressure of the twice-compressed hydrogen gas is set according to user requirements.

The method of the present invention is a process for mixing transmission and separation of hydrogen gas and hydrogen compressed natural gas recovered based on pressure energy. A process of recovery without pressure energy consumes greatly more energy than a process of recovery with pressure energy; a heat equilibrium system of the pressure energy recovery apparatus is used, the heat equilibrium of the apparatus, itself is performed by using heat generated by expansion and compression of the pressure energy apparatus; the method of the present invention is low in energy consumption, so as to realize pressure energy recovery, and the pressure energy is converted into, mechanical energy of the compressor, which greatly reduces energy consumption of hydrogen gas separation; compared with existing hydrogen gas transportation means (tube trailer, liquid hydrogen tank truck), the usage of transporting hydrogen compressed natural gas and separating it at terminal realizes large-scale low-cost hydrogen gas transportation.

BRIEF DESCRIPTION OF THE DRAWINGS

FIG. 1 is a schematic structural diagram of an apparatus for mixing transmission and separation of hydrogen gas and natural gas recovered based on pressure energy of the present invention.

In the drawing, 1, Hydrogen compressed natural gas pipeline, 2, General buffer tank, 3, Expander, 4, First natural gas compressor, 5, First hydrogen gas compressor, 6, Water storage tank, 7, Separation system, 8, First hydrogen gas buffer tank, 9, First natural gas buffer tank, 10, Second hydrogen gas buffer tank, 11, Second natural gas buffer tank, 12, Second hydrogen gas compressor, 13, Second natural gas compressor, 14, Pipeline connected to natural gas user end, 15, Pipeline connected to hydrogen gas user end; 16, Water pump, 17, Gas inlet of expander, 18, Gas outlet of expander, 19, Gas inlet of first natural gas compressor, 20, Gas outlet of first natural gas compressor, 21, Gas inlet of first hydrogen gas compressor, 22, Gas outlet of first hydrogen gas compressor, 23, Gas inlet of second natural gas compressor, 24, Gas outlet of second natural gas compressor, 25, Gas inlet of second hydrogen gas compressor, 26, Gas outlet of second hydrogen gas compressor, 27, Auxiliary motor.

DETAILED DESCRIPTION OF THE EMBODIMENTS

In order to make the purpose, technical solutions and advantages of the present application clear, the following detailed description will be further described below in conjunction with the drawings and specific embodiments. It should be understood that the specific embodiments described here is only used for explaining the present invention, instead of limiting the present invention. Further, the technical features according to the various embodiments of the present invention described below may be combined with each other as long as they do not constitute a collision among each other.

A membrane separation apparatus in the embodiments of the present invention is based on the hydrogen gas separation membrane system reported in Study of Engineering Application of New Process of Purifying Hydrogen gas from 330,000 tons per year Dry Gas (Wen Shuang). Its main function is to separate hydrogen gas from raw material gas, and the raw material gas containing different concentrations of hydrogen gas may be separated to obtain high concentration hydrogen gas.

The pressure swing adsorption apparatus in the embodiments of the present invention is based on the scheme reported in patent No. CN101535174A, entitled "Hydrogen Gas Separation Method and Separation Apparatus". Its main function is to separate hydrogen gas from raw material gas, and different absorption with pressure and desorption with reduced pressure are employed alternatively in cycles, so as to achieve hydrogen gas separation.

The membrane separation-pressure swing adsorption apparatus in the embodiments of the present invention is based on Application of Membrane Separation and PSA Coupling Process in Hydrogen Recovery Unit of a Million-ton Refinery (Yu Yongyang). Its process membrane separation apparatus is responsible for concentrating hydrogen gas, the pressure swing adsorption separation apparatus is responsible for purifying hydrogen gas, so as to obtain high purity hydrogen gas by separation.

The cooling water in the embodiments of the present invention is at room temperature, the temperature of the cooling water that absorbs the al energy is ≤35° C.

The stable state in the embodiments of the present invention refers to the operating parameters of the expander within the normal value range.

Embodiment 1

The structure of the apparatus for mixing transmission and separation of hydrogen gas and natural gas recovered based on pressure energy is as shown in FIG. 1, and includes a hydrogen compressed natural gas pipeline 1, a pressure energy recovery system, a separation system and a pressure boosting system.

The pressure energy recovery system is composed of an expander 3, a first natural gas compressor 3, and a first hydrogen gas compressor 5; the expander 3 is provided thereon with a gas inlet 17 of the expander, a gas outlet 18 of the expander, a water inlet of the expander and a water outlet of the expander; the first natural gas compressor 4 is provided thereon with a gas inlet 19 of the first natural gas compressor, a gas outlet 20 of the first natural gas compressor, a water inlet of the first natural gas compressor and a water outlet of the first natural gas compressor; the first hydrogen gas compressor 5 is provided thereon with a gas inlet 21 of the first hydrogen gas compressor, a gas outlet 22 of the first hydrogen gas compressor, a water inlet of the first hydrogen gas compressor and a water outlet of the first hydrogen gas compressor.

The expander 3 is assembled with an auxiliary motor 27, and the first natural gas compressor 4 is connected in parallel with the first hydrogen gas compressor 5, and is assembled with the auxiliary motor 27; the separation system is composed of a separation apparatus 7, a first hydrogen gas buffer tank 8, and a first natural gas buffer tank 9.

The separation apparatus 7 is provided with a gas inlet, a hydrogen gas outlet, and a natural gas outlet; the first hydrogen gas buffer tank 8 is provided thereon with a gas inlet and a gas outlet, the first natural gas buffer tank 9 is provided thereon with an gas inlet and a gas outlet; the pressure boosting system is composed of a second natural gas compressor 12 and a second hydrogen gas compressor 13; the second natural gas compressor 12 is provided thereon with a gas inlet 23 of the second natural gas compressor and a gas outlet 24 of the second natural gas compressor, and the second hydrogen gas compressor is provided thereon with a gas inlet 25 of the second hydrogen gas compressor and a gas outlet 26 of the second hydrogen gas compressor.

The gas outlet of the hydrogen compressed natural gas pipeline 1 is communicated with an inlet of a general buffer tank 2, an outlet of the general buffer tank 2 is communicated with the gas inlet 17 of the expander, and the gas outlet 18 of the expander is communicated with the gas inlet of the separation apparatus 7, the hydrogen gas outlet of the separation apparatus 7 is communicated with the gas inlet of the first hydrogen gas buffer tank 8, the natural gas outlet of the separation apparatus 7 is communicated with the gas inlet of the first natural gas buffer tank 9.

The gas outlet of the first hydrogen gas buffer tank 8 is communicated with the gas inlet 21 of the first hydrogen gas compressor, and the gas outlet of the first natural gas buffer tank 9 is communicated with the gas inlet 19 of the first natural gas compressor.

The gas outlet 22 of the first hydrogen gas compressor is communicated with the gas inlet of the second hydrogen gas buffer tank 10, the gas outlet 20 of the first natural gas compressor is communicated with the gas inlet of the second natural gas buffer tank 11; the gas outlet of the second hydrogen gas buffer tank 10 is communicated with the gas inlet 25 of the second hydrogen gas compressor; the gas outlet of the second natural gas buffer tank 11 is communicated with the gas inlet 23 of the second natural gas compressor; the gas outlet 26 of the second hydrogen gas compressor is communicated with a pipeline 15 that is connected to a hydrogen gas user end or the hydrogen compressed natural gas pipeline 1; the gas outlet 24 of the second natural gas compressor is communicated with a pipeline 14 that is connected to a natural gas user end.

The water outlet of the expander 3 is communicated with a water inlet of a water storage tank 6, a water outlet of the water storage tank 6 is simultaneously communicated with the water inlet of the first natural gas compressor 14 and the water inlet of the first hydrogen gas compressor 5 through a pipeline with a water pump 16; the water outlet of the first natural gas compressor 4 and the water outlet of the first hydrogen gas compressor 5 are simultaneously communicated with the water inlet of the expander 3 through the pipeline.

The separation apparatus 7 is a membrane separation apparatus.

The method is processed in the following steps.

Hydrogen compressed natural gas in the hydrogen compressed natural gas pipeline is introduced into a general buffer tank, the hydrogen compressed natural gas in the general buffer tank is introduced into an expander, and the pressure of the hydrogen compressed natural gas is released through the expander, and then low-pressure hydrogen compressed natural gas is formed; the transition of the pressure energy recovery apparatus from a start-up to a stable operation is divided into two stages: a start-up stage and a stable stage; in the start-up stage, the hydrogen compressed natural gas enters into the expander and provides primary power to the pressure energy recovery system through the auxiliary motor, energy is released through gas expansion to provide a portion of power; during the gas expansion, the auxiliary motor is controlled to provide gradually decreased power, and the power provided by the gas expansion is gradually increased; when the rotating speed of a turbine wheel of the expander reaches a stable state, i.e. entering into the stable stage, at the moment the auxiliary motor is only used to maintain the turbine wheel rotating speed of the expander in a normal working, section.

The low-pressure hydrogen compressed natural gas is introduced into the separation apparatus, and is discharged, after separation, from the hydrogen gas outlet and the natural gas outlet, respectively, and low-hydrogen natural gas and high concentration hydrogen gas are respectively formed; the volume concentration of hydrogen gas in the low-hydrogen natural gas is 3%; the volume concentration of hydrogen gas in the high concentration hydrogen gas is 80%.

The low-hydrogen natural gas and the high concentration hydrogen gas are introduced into the first natural gas buffer tank and the first hydrogen gas buffer tank respectively, and then are introduced into the first natural gas compressor and the first hydrogen gas compressor, and after first, compression, are formed into once-compressed natural gas and once-compressed hydrogen gas; after the turbine wheel rotating speed of the expander reaches the stable state and when the gas in the expander expands, the wheel of the expander is pushed to rotate; when the wheel of the expander rotates, a rotating shaft is driven to rotate to provide mechanical energy for the first natural gas compressor and the first hydrogen gas compressor; a water pump assembled with a water storage tank is switched on to introduce cooling water in the water storage tank into the first natural gas compressor and the first hydrogen gas compressor; when the first natural gas compressor and the first hydrogen gas compressor are operating, thermal energy generated is absorbed by the cooling water, the cooling water that absorbs thermal energy is introduced into the expander to exchange heat with residual cold generated by operation of the expander, then the cooling water is formed again and returned, back to the water storage tank; during the process, thermal energy generated by the first natural gas compressor and the first hydrogen gas compressor is neutralized with the cold energy generated by the expander.

The once-compressed natural gas and the once-compressed hydrogen gas are introduced into the second natural gas buffer tank and the second hydrogen gas buffer tank respectively, and then are introduced into the second natural gas compressor and the second hydrogen gas compressor, and after second compression, are formed into twice-compressed natural gas and twice-compressed hydrogen gas.

The twice-compressed natural gas and the twice-compressed hydrogen gas are respectively introduced into the natural gas user end and the hydrogen gas user end or returned back to the hydrogen compressed natural gas pipeline.

The pressure of the hydrogen compressed natural gas in the hydrogen compressed natural gas pipeline is 10 MPa, and its ingredients contain 10% by volume of $H_2$, and 90% by volume of $CH_4$.

The pressure of the low-pressure hydrogen compressed natural gas is 4 Mpa.

The pressure of the once-compressed natural gas is 95% of the pressure of the hydrogen compressed natural gas; the pressure of the once-compressed hydrogen gas is 95% of the pressure of the hydrogen compressed natural gas.

When the expander is used to release pressure, the mechanical energy is recovered to be used as the mechanical energy of the first natural gas compressor and the first hydrogen gas compressor, the recovery rate of the mechanical energy is 95%.

The pressure of the twice-compressed natural gas is 1.1 times the pressure of the hydrogen compressed natural gas; when the twice-compressed hydrogen gas returns back to the hydrogen compressed natural gas pipeline, the pressure of the twice-compressed hydrogen gas is 1.1 times the pressure of the hydrogen compressed natural gas; when the twice-compressed hydrogen gas is introduced into the hydrogen gas user end, the pressure of the twice-compressed hydrogen gas is set according to user requirements; when the apparatus and the method of the present embodiment are employed, the total power after heat exchange is 20 kw; in the absence of the pressure energy recovery apparatus, the compressor is required to boost pressure, the total pressure is 65*kw*, and the pressure energy released from 10 MPa to 4 MPa is wasted.

Embodiment 2

The structure of the apparatus for mixing transmission and separation of hydrogen gas and natural gas recovered based on pressure energy is the same as Embodiment 1, the difference lies in the following.

The separation apparatus 7 is a pressure swing adsorption apparatus.

The method is the same as Embodiment 1, but the differences lie in the following.
  (1) The volume concentration of hydrogen gas in the low-hydrogen natural gas is 2%; the volume concentration of hydrogen gas in the high concentration hydrogen gas is 85%.
  (2) The pressure of the hydrogen compressed natural gas in the hydrogen compressed natural gas pipeline is 9 MPa.
  (3) The pressure of the low-pressure hydrogen compressed natural gas formed after the pressure in the expander is released is 4.5 MPa.
  (4) The pressure of the once-compressed natural gas is 80% of the pressure of the hydrogen compressed natural gas; the pressure of the once-compressed hydrogen gas is 80% of the pressure of the hydrogen compressed natural gas.
(5) The recovery rate of mechanical energy is 80%.
(6) The pressure of the twice-compressed natural gas is 1.2 times the pressure of the hydrogen compressed natural gas; when the twice-compressed hydrogen gas returns back to the hydrogen compressed natural gas pipeline, the pressure of the twice-compressed hydrogen gas is 1.2 times the pressure of the hydrogen compressed natural gas.

Embodiment 3

The structure of the apparatus for mixing transmission and separation of hydrogen gas and natural gas recovered based on pressure energy is the same as Embodiment 1, the difference lies in the following.

The separation apparatus 7 is a membrane separation-pressure swing adsorption apparatus.

The method is the same as Embodiment 1, but the differences lie in the following.
(1) The volume concentration of hydrogen gas in the low-hydrogen natural gas is 2%; the volume concentration of hydrogen gas in the high concentration hydrogen gas is 85%.
(2) The pressure of the hydrogen compressed natural gas in the hydrogen compressed natural gas pipeline is 8 MPa.
(3) The pressure of the low-pressure hydrogen compressed natural gas formed after the pressure in the expander is released is 3 MPa.
(4) The pressure of the once-compressed natural gas is 50% of the pressure of the hydrogen compressed natural gas; the pressure of the once-compressed hydrogen gas is 50% of the pressure of the hydrogen compressed natural gas.
(5) The recovery rate of the mechanical energy is 50%.
(6) The pressure of the twice-compressed natural gas is 1.2 times the pressure of the hydrogen compressed natural gas; when the twice-compressed hydrogen gas returns back to the hydrogen compressed natural gas pipeline, the pressure of the twice-compressed hydrogen gas is 1.2 times the pressure of the hydrogen compressed natural gas.

What is claimed is:

1. An apparatus for mixing transmission and separation of hydrogen gas and natural gas recovered based on pressure energy, comprising a hydrogen compressed natural gas pipeline, a pressure energy recovery system, a separation system and a pressure boosting system; wherein the pressure energy recovery system is composed of an expander, a first natural gas compressor, and a first hydrogen gas compressor; the expander being provided thereon with a gas inlet, a gas outlet, a water inlet and a water outlet; the first natural gas compressor being provided thereon with a gas inlet, a gas outlet, a water inlet and a water outlet; the first hydrogen gas compressor being provided thereon with a gas inlet, a gas outlet, a water inlet and a water outlet; the expander being assembled with an auxiliary motor, and the first natural gas compressor being connected in parallel with the first hydrogen gas compressor, and being assembled with the auxiliary motor; the separation system is composed of a separation apparatus, a first hydrogen gas buffer tank, and a first natural gas buffer tank; the separation apparatus being provided with a gas inlet, a hydrogen gas outlet, and a natural gas outlet; the first hydrogen gas buffer tank being provided thereon with a gas inlet and a gas outlet, the first natural gas buffer tank being provided thereon with a gas inlet and a gas outlet; the pressure boosting system is composed of a second natural gas compressor and a second hydrogen gas compressor; the second natural gas compressor being provided thereon with a gas inlet and a gas outlet, and the second hydrogen gas compressor being provided thereon with a gas inlet and a gas outlet; a gas outlet of the hydrogen compressed natural gas pipeline is communicated with an inlet of a general buffer tank, an outlet of the general buffer tank is communicated with the gas inlet of the expander, and the gas outlet of the expander is communicated with the gas inlet of the separation apparatus, the hydrogen gas outlet of the separation apparatus is communicated with the gas inlet of the first hydrogen gas buffer tank, the natural gas outlet of the separation apparatus is communicated with the gas inlet of the first natural gas buffer tank; the gas outlet of the first hydrogen gas buffer tank is communicated with the gas inlet of the first hydrogen gas compressor, and the gas outlet of the first natural gas buffer tank is communicated with the gas inlet of the first natural gas compressor; the gas outlet of the first hydrogen gas compressor is communicated with the gas inlet of the second hydrogen gas buffer tank, the gas outlet of the first natural gas compressor is communicated with the gas inlet of the second natural gas buffer tank; the gas outlet of the second hydrogen gas buffer tank is communicated with the gas inlet of the second hydrogen gas compressor; the gas outlet of the second natural gas buffer tank is communicated with the gas inlet of the second natural gas compressor; the gas outlet of the second hydrogen gas compressor is communicated with a hydrogen gas user or the hydrogen compressed natural gas pipeline; the gas outlet of the second natural gas compressor is communicated with the hydrogen compressed natural gas pipeline, or a natural gas user end.

2. The apparatus for mixing transmission and separation of hydrogen gas and natural gas recovered based on pressure energy of claim 1, wherein the water outlet of the expander is communicated with a water inlet of a water storage tank, a water outlet of the water storage tank is simultaneously communicated with the water inlet of the first natural gas compressor and the water inlet of the first hydrogen gas compressor through a pipeline with a water pump; the water outlet of the first natural gas compressor and the water outlet of the first hydrogen gas compressor are simultaneously communicated with the water inlet of the expander through the pipeline.

3. The apparatus for mixing transmission and separation of hydrogen gas and natural gas recovered based on pressure energy of claim 1, wherein the separation apparatus is a membrane separation apparatus or a pressure swing adsorption apparatus, or a membrane separation-pressure swing adsorption apparatus.

4. A method for mixing transmission and separation of hydrogen gas and natural gas recovered based on pressure energy, wherein the apparatus of claim 1 is employed to process the following steps:
(1) introducing hydrogen compressed natural gas in a hydrogen compressed natural gas pipeline into a general buffer tank, introducing the hydrogen compressed natural gas in the general buffer tank into an expander, and releasing the pressure of the hydrogen compressed natural gas through the expander, and then forming low-pressure hydrogen compressed natural gas; dividing the transition of the pressure energy recovery apparatus from start-up to stable operation into two stages: a start-up stage and a stable stage; in the start-up stage, making the hydrogen compressed natural gas entering into the expander and providing, by the auxiliary motor, primary power to the pressure energy recovery system, releasing energy by gas expansion to provide a portion of power; during the gas expansion, controlling the auxiliary motor to provide gradually decreased power, and gradually increasing the power provided by the gas expansion; when the rotating speed of a turbine wheel of the expander reaches a stable state, i.e. entering into the stable stage, at the moment the auxiliary motor is only used to maintain the turbine wheel rotating speed of the expander in a normal working section;

(2) introducing the low-pressure hydrogen compressed natural gas into a separation apparatus, and discharging it, after separation, from a hydrogen gas outlet and a natural gas outlet, respectively, so as to form low-hydrogen natural gas and high concentration hydrogen gas respectively; wherein the volume concentration of hydrogen gas in the low-hydrogen natural gas is ≤3%; the volume concentration of hydrogen gas in the high concentration hydrogen gas is ≥80%;

(3) introducing the low-hydrogen natural gas and the high concentration hydrogen gas into a first natural gas buffer tank and a first hydrogen gas buffer tank respectively, and then introducing both into a first natural gas compressor and a first hydrogen gas compressor, and, after first compression, forming once-compressed natural gas and once-compressed hydrogen gas respectively;

(4) introducing the once-compressed natural gas and the once-compressed hydrogen gas into a second natural gas buffer tank and a second hydrogen gas buffer tank respectively, and then introducing both into a second natural gas compressor and a second hydrogen gas compressor, and, after second compression, forming into twice-compressed natural gas and twice-compressed hydrogen gas; and (5) introducing the twice-compressed natural gas and the twice-compressed hydrogen gas into the natural gas user end and the hydrogen gas user end respectively or returning both back to the hydrogen compressed natural gas pipeline.

5. The method for mixing transmission and separation of hydrogen gas and natural gas recovered based on pressure energy of claim 4, wherein at S(3), after the turbine wheel rotating speed of the expander reaches the stable state and when the gas in the expander expands, the wheel of the expander is pushed to rotate; when the wheel of the expander rotates, a rotating shaft is driven to rotate to provide mechanical energy for the first natural gas compressor and the first hydrogen gas compressor.

6. The method for mixing transmission and separation of hydrogen gas and natural gas recovered based on pressure energy of claim 4, wherein at S(3), a water pump assembled with a water storage tank is switched on to introduce cooling water in the water storage tank into the first natural gas compressor and the first hydrogen gas compressor; when the first natural gas compressor and the first hydrogen gas compressor are operating, thermal energy generated is absorbed by the cooling water, the cooling water that absorbs thermal energy is introduced into the expander to exchange heat with residual cold generated by operation of the expander, then the cooling water is formed again and returned back to the water storage tank; during the process, thermal energy generated by the first natural gas compressor and the first hydrogen gas compressor is neutralized with the cold energy generated by the expander.

7. The method for mixing transmission and separation of hydrogen gas and natural gas recovered based on pressure energy of claim 4, wherein at S(1), the pressure of the hydrogen compressed natural gas in the hydrogen compressed natural gas pipeline is ≤10 MPa.

8. The method for mixing transmission and separation of hydrogen gas and natural gas recovered based on pressure energy of claim 4, wherein at S(1), the pressure of the low-pressure hydrogen compressed natural gas formed after the pressure in the expander is released is ≤4 MPa.

9. The method for mixing transmission and separation of hydrogen gas and natural gas recovered based on pressure energy of claim 4, wherein at S(3), the pressure of the once-compressed natural gas is 50% to 95% of the pressure of the hydrogen compressed natural gas; the pressure of the once-compressed hydrogen gas is 50% to 95% of the pressure of the hydrogen compressed natural gas.

10. The method for mixing transmission and separation of hydrogen gas and natural gas recovered based on pressure energy of claim 4, wherein at S(3), when the expander is used to release pressure, the mechanical energy is recovered to be used as the mechanical energy for the first natural gas compressor and the first hydrogen gas compressor, the recovery rate of the mechanical energy is from 50% to 95%.

* * * * *